United States Patent
Yu et al.

(10) Patent No.: US 11,485,857 B2
(45) Date of Patent: Nov. 1, 2022

(54) AMINO SILICONE OIL-MODIFIED ELASTOMER MATERIAL AND PREPARATION METHOD THEREOF

(71) Applicant: Zhejiang Yuanrong Technology Co., Ltd, Hangzhou (CN)

(72) Inventors: Songmao Yu, Hangzhou (CN); Lvming Xiao, Hangzhou (CN); Yangang Yu, Hangzhou (CN); Wanqin Zhang, Hangzhou (CN); Qiwei Zheng, Hangzhou (CN)

(73) Assignee: Zhejiang Yuanrong Technology Co., Ltd, Hangzhou (CN)

( * ) Notice: Subject to any disclaimer, the term of this patent is extended or adjusted under 35 U.S.C. 154(b) by 465 days.

(21) Appl. No.: 16/747,573

(22) Filed: Jan. 21, 2020

(65) Prior Publication Data
US 2020/0291229 A1 Sep. 17, 2020

(30) Foreign Application Priority Data
Mar. 11, 2019 (CN) .......................... 201910181600.5

(51) Int. Cl.
| C08L 75/02 | (2006.01) |
| C08G 18/76 | (2006.01) |
| C08G 18/48 | (2006.01) |
| C08G 18/38 | (2006.01) |
| C08G 18/52 | (2006.01) |
| C08G 18/61 | (2006.01) |
| C08G 18/71 | (2006.01) |
| C08G 18/66 | (2006.01) |
| C08G 18/10 | (2006.01) |

(52) U.S. Cl.
CPC .............. *C08L 75/02* (2013.01); *C08G 18/10* (2013.01); *C08G 18/3819* (2013.01); *C08G 18/3895* (2013.01); *C08G 18/4812* (2013.01); *C08G 18/4825* (2013.01); *C08G 18/4829* (2013.01); *C08G 18/52* (2013.01); *C08G 18/61* (2013.01); *C08G 18/6685* (2013.01); *C08G 18/71* (2013.01); *C08G 18/7664* (2013.01); *C08L 2205/03* (2013.01); *C08L 2205/05* (2013.01); *C08L 2310/00* (2013.01)

(58) Field of Classification Search
CPC .......... C08L 75/02; C08L 75/00; C08L 75/04; C08L 81/00; C08L 81/04; C08G 18/52; C08G 18/6453
See application file for complete search history.

(56) References Cited

U.S. PATENT DOCUMENTS

| 4,607,090 A * | 8/1986 | Dominguez ....... C08G 18/5024 264/DIG. 83 |
| 2003/0162874 A1* | 8/2003 | Redford .................. C09D 7/00 524/262 |
| 2008/0255312 A1* | 10/2008 | Mielke ...................... C08F 8/40 525/418 |
| 2012/0010314 A1* | 1/2012 | Charpentier ............. C09D 7/62 521/157 |
| 2013/0079485 A1* | 3/2013 | Cai ..................... C08G 18/7621 528/68 |
| 2013/0331484 A1* | 12/2013 | Braum ................. C08G 18/718 156/62.4 |
| 2014/0316073 A1* | 10/2014 | Locke ................ C08G 18/4202 568/69 |
| 2015/0265743 A1* | 9/2015 | Hanson ................... A61L 15/32 424/617 |
| 2017/0183534 A1* | 6/2017 | Iezzi .................. C08G 18/6685 |
| 2019/0322789 A1* | 10/2019 | Lubitz .................... C08G 18/12 |
| 2020/0239730 A1* | 7/2020 | Martin ..................... B05D 1/02 |
| 2020/0291171 A1* | 9/2020 | Yu .......................... C08G 18/724 |
| 2020/0291229 A1* | 9/2020 | Yu ........................ C08G 18/4825 |
| 2020/0361136 A1* | 11/2020 | Fenn ..................... B29C 64/336 |

FOREIGN PATENT DOCUMENTS

| CN | 103820013 A | * | 5/2014 |
| CN | 104231894 A | * | 12/2014 |

OTHER PUBLICATIONS

Google Translation of CN 103820013 (Year: 2022).*
Google Translation of CN 104231894 (Year: 2022).*
Datasheet Xiameter OFX-0531 Fluid (Year: 2022).*
Datasheet Wannate MDI 100 (Year: 2022).*

* cited by examiner

*Primary Examiner* — Michael M Dollinger
(74) *Attorney, Agent, or Firm* — Bayramoglu Law Offices LLC

(57) ABSTRACT

An amino silicone oil-modified elastomer material includes Component A and Component R. Component A includes isocyanate prepolymer obtained through reaction of polyol and isocyanate, and the isocyanate prepolymer has a —NCO content of 22-30%; Component R includes the following components in parts by weight: 45-60 parts of polyether amine, 1-6 parts of liquid amine chain extender, 1-10 parts of polysulfide rubber, 2-8 parts of nano silica, and 3-8 parts of amino silicone oil. The elastomer material of the invention ensures the elasticity of the polymer while improving mechanical properties. Moreover, it can improve elongation, wear resistance and water resistance of the polyurea material.

16 Claims, No Drawings

AMINO SILICONE OIL-MODIFIED ELASTOMER MATERIAL AND PREPARATION METHOD THEREOF

CROSS REFERENCE TO THE RELATED APPLICATIONS

This application is based upon and claims priority to Chinese Patent Application No. 2019101816005, filed on Mar. 11, 2019, the entire contents of which are incorporated herein by reference.

TECHNICAL FIELD

The invention relates to the technical field of polyurea materials, in particular to an amino silicone oil-modified elastomer material and its preparation method.

BACKGROUND

Polyurea material has high impact and wear resistance, good anti-seepage effect, corrosion resistance and comprehensive mechanical properties. It has been widely used in national defense, civil engineering and water conservancy and hydropower projects. In order to further improve the performance of the polyurea material, the polyurea material is modified by adding a filler and the like through simple physical blending in the prior art.

However, with respect to the current modification methods, the compatibility between the filler and the polyurea material is poor, the adhesion of the filler is weak and the filler is easily detached from the polyurea material, resulting in poor wear resistance, plenty of pores in the polyurea material and poor water resistance. Thus, the prior art can not improve multiple properties of the polyurea material simultaneously.

In view of this, this invention is specifically proposed.

SUMMARY

A first object of the invention is to provide an amino silicone oil-modified elastomer material, wherein the amino silicone oil-modified elastomer material can improve elongation, abrasion resistance and water resistance of the polyurea material.

A second object of the invention is to provide a method for preparing the elastomer material. The operation of the preparation method is simple, the preparation conditions are mild, and the prepared elastomer material has good structural stability and excellent performance.

In order to achieve the above objects of the invention, the following technical solution is adopted:

An amino silicone oil-modified elastomer material comprises Component A and Component R;

Component A comprises isocyanate prepolymer obtained through reaction of polyol and isocyanate, and isocyanate prepolymer has a —NCO content of 22-30%;

Component R includes the following components in parts by weight: 45-60 parts of polyether amine, 1-6 parts of liquid amine chain extender, 1-10 parts of polysulfide rubber, 2-8 parts of nano silica, and 3-8 parts of amino silicone oil.

The invention adjusts the —NCO content of isocyanate prepolymer to increase the hard segment content, thus reducing the soft segment content, increasing the content of urea bonds in the elastomer and the rigid chain segments, and improving the hardness, tear strength, tensile strength and other mechanical properties. Meanwhile, the polyetheramine and polysulfide rubber blended in Component R ensure the elasticity of the polymer while improving the mechanical properties.

The invention improves the elasticity by the addition of polysulfide rubber, and simultaneously grafts silica into the elastomer material by using amino silicone oil and nano silica to improve the mechanical properties of the material and high-temperature resistance of the material.

Silica is added to Component R, and the silica is grafted into the elastomer material through coupling and other reactions. Silica can also be blended with amino silicone oil. In case the added amount of silica is small, amino silicone oil can improve the compatibility of silica, increase the degree of grafting of silica in polyurea materials, and greatly improve the impact strength and puncture resistance of the material. Moreover, the addition of amino silicone oil can improve the compatibility between silica and other organic materials, avoid the detachment of silica, and improve the bonding of silica to the organic phase, thereby further improving the strength, bonding tightness, elongation, wear resistance and water resistance of the material.

Preferably, the mass ratio of nano silica to amino silicone oil is 1: (0.8-1.2), preferably 1: (0.9-1.1), more preferably 1:1.

By adjusting the amount of silica and amino silicone oil in the above range, improvement of the compatibility and interfacial properties between amino silicone oil and silica is ensured, and excessive addition of amino silicone oil is avoided, to prevent excessive flexibility chain and decreased strength.

Preferably, the nano silica is surface-pretreated nano silica. More preferably, the surface pretreatment comprises: grafting of coupling agent on the surface of nano silica. Further preferably, the coupling agent is a silane coupling agent.

Preferably, nano silica has a particle diameter of 50 to 80 nm, preferably 50 to 70 nm, more preferably 50 to 60 nm.

When the size of the silica is within the above range, the graft compatibility of the silica material in the elastomer material can be sufficiently improved, and the overall performance of the elastomer material can be improved. If the size of the silica is too small and the agglomeration force is too large, most of the silica in the obtained elastomer material cannot be effectively grafted, resulting in material sedimentation and dispersion, and reduced mechanical properties; if the size is too large, the coating process of the elastomer material will be affected, and the obtained elastomer material is insufficient in strength.

Preferably, the functionality ratio of Component A to Component R is 1: (1-1.05).

Preferably, isocyanates include diisocyanate and/or triisocyanate. More preferably, isocyanates further include monoisocyanate. Further preferably, diisocyanate includes any one of p-phenylene diisocyanate, 4,4'-diphenylmethane diisocyanate, and toluene diisocyanate. Preferably, any one of p-phenylene diisocyanate and 4,4'-diphenylmethane diisocyanate, and more preferably, p-phenylene diisocyanate.

P-phenylene diisocyanate and 4,4'-diphenylmethane diisocyanate have a high symmetry and high degree of regularity. As a hard segment in the polymer, they are more likely to aggregate, and the hard segment has an increased molecular mass and increased crystallinity, thus improving the mechanical properties of the elastomer, such as tensile strength and tear strength.

Preferably, isocyanates comprise monoisocyanate, diisocyanate and triisocyanate with a molar ratio of (0.1-0.3):(6-

10):(1-2). More preferably, isocyanates comprise monoisocyanate, diisocyanate and triisocyanate with a molar ratio of 0.2:(8-9):1.

Isocyanates include the above three types, which are blended in a certain ratio to make the molecular weight of the prepared prepolymer moderate and avoid the excessive molecular weight, which results in difficult mixing and spraying. Trifunctional reactants give the polymer a certain crosslinking density, bifunctional reactants provide a certain degree of crystallinity, and monofunctional reactants modulate the molecular weight, thus taking into account mechanical strength, hardness and elasticity, and avoiding elastic loss due to an excessively large cross-linking density, and improper mechanical strength due to an excessively small cross-linking density.

Preferably, the polyol comprises glycol and/or triol. More preferably, the polyol comprises glycol and triol with a molar ratio of (4-6):1.

Through the ratio of glycol to triol, the structure of the polymer is adjusted, and the crosslinking density and crystallinity are also considered, so that the polymer has good comprehensive properties.

Preferably, the polyol includes any one of polyester polyol and polyether polyol. More preferably, the polyol is polyether polyol.

Preferably, the polyether amine comprises any one or more of polyether triamine and polyether diamine. More preferably, the polyether amine comprises polyether triamine and polyether diamine with a mass ratio of 1:(2-4). The polyether amine has a number average molecular weight of 400 to 5,000, preferably from 1,000 to 4,000, more preferably from 1,500 to 2,500.

The polyether amine acts as a reactive soft segment and reacts with the isocyanate prepolymer to form urea-containing polymer. By adjusting the molecular weight of the polyether amine, both the elasticity and strength of the polyurea are taken into consideration.

Preferably, the polyether amine comprises terminal amino polyoxypropylene ether and/or terminal amino polyoxyethylene ether.

Preferably, the liquid amine chain extender comprises one or more of diethyl methane diamine, dimethyl toluene diamine and dialkethylene diamine.

The invention adopts a chain extender with small molecular weight to diffuse and elongate molecular chains and improve the mechanical properties of the polymer. The conventional chain extender has a large molecular weight, and the obtained polymer has a small molecular weight. In combination with other components, a chain extender with small molecular weight is used to increase the molecular weight, surface hardness, impact strength and other mechanical properties of the polymer.

The invention also provides a preparation method of elastomer material, comprising the following steps:

Heat and dehydrate the polyol, react with isocyanates at 50-90° C. for 2-3 h, and defoam to obtain Component A;

Mix nano silica and amino silicone oil uniformly, add polyether amine, liquid amine chain extender and polysulfide rubber, mix them and heat to 50-90° C., and stir for 20-50 min to obtain Component R.

Preferably, mix nano silica and amino silicone oil and stir uniformly at the rotational speed of 1000-1500 rpm. More preferably, the stirring time is 10-20 min.

Preferably, mix Component A and Component R with the supergravity mixing method, and spray to obtain the elastomer material.

The monomer of the components has a nanometer-sized uniformity during the reaction, so that the material has a micron-level closed-cell structure microscopically, and an isotropic honeycomb structure is obtained. When impacted, the pore walls bend to create linear elasticity, and when the critical stress is reached, the pores begin to collapse. Since it is an elastomer material, the collapse is caused by the elastic buckling of the pore walls, so it can restore, thereby increasing the strength of the elastomer material.

Preferably, heat Component A and Component R to 55-70° C., adjust the pressure to 30-40 MPa, mix with the supergravity mixing method, and spray to obtain the elastomer material.

By adjusting the temperature and pressure within the above range, Component A and Component R can be thoroughly mixed with the super-gravity mixing technique, and elastomer with a moderate pore size and good distribution uniformity of pores can be obtained, which contributes to further improvement of the strength of the elastomer.

Compared with the prior art, the advantages of the invention are as follows:

(1) The invention adjusts the —NCO content of isocyanate prepolymer to increase the hard segment content and the rigid chain segments in the elastomer, and combines polyether amine and polysulfide rubber in Component R, taking into account the elasticity and mechanical properties of the material;

(2) Add nano silica and amino silicone oil to the components to improve the grafting degree of silica in the elastomer material, thus improving the wear resistance of the material, structural compactness and water resistance;

(3) The operation of the preparation method of the invention is simple, and the preparation conditions are mild. By adjusting the temperature and pressure within the above range, Component A and Component R can be thoroughly mixed with the super-gravity mixing technique. The monomer of the components has a nanometer-sized uniformity during the reaction, so that the material has a micron-level closed-cell structure microscopically, and an isotropic honeycomb structure is obtained, thus improving the strength of the elastomer material.

DETAILED DESCRIPTION OF THE EMBODIMENTS

The technical solutions of the invention will be clearly and completely described below in combination with the specific embodiments, those skilled in the art will understand that the embodiments described below are a part of the embodiments of the invention, and not exhaustive. Such embodiments are intended to illustrate the invention and not to limit the scope of the invention. All other embodiments obtained by those skilled in the art based on the embodiments of the invention without creative efforts fall within the scope of protection of the invention. Conditions not specifically specified in the embodiments are conventional conditions or the conditions recommended by the manufacturers. Reagents or instruments used whose manufacturers are not indicated are commercially available conventional products.

The information about some reagents used in the embodiments of the invention is as follows:

Polyether triol, manufacturer: Bayer, model: ARCOL-5613;

Polyether glycol, manufacturer: Bayer, model: ARCOL-1011;

Polyether triamine, manufacturer: Hubei Qifei Pharmaceutical Chemical Co., Ltd., model: H362005;

Polyether diamine, manufacturer: Huntsman, model: T-3000;

Polysulfide rubber, manufacturer: Jinxi Research Institute of Chemical Industry, model: JLY-121;

Amino silicone oil, manufacturer: Nanjing Golden Chemical Co., Ltd., model: OFX-0531.

Embodiment 1

The elastomer material of this embodiment comprises Component A and Component R. Component A comprises isocyanate prepolymer obtained through reaction of polyether polyol with methyl isocyanate, p-phenylene diisocyanate and triphenylmethane isocyanate, and the isocyanate prepolymer has a —NCO content of 25%;

Component R comprises the following components in parts by weight: 12 parts of polyether triamine, 36 parts of polyether diamine, 3 parts of diethyl methane diamine, 5 parts of polysulfide rubber, 5 parts of surface-pretreated nano silica and 5 parts of amino silicone oil.

The preparation method of the elastomer material comprises the following steps:

(1) Mix 30 g of polyether triol and 100 g of polyether diol uniformly, heat to 100-120° C. for dehydration for 2-3 h, then cool to 70° C., add 1 g of methyl isocyanate, 135 g of p-phenylene diisocyanate, 35 g of triphenylmethane isocyanate, react for 2-3 h under heat insulation conditions, and defoam and cool to obtain Component A with a —NCO content of 25±1%;

(2) Mix 5 parts of surface-pretreated nano silica and 5 parts of amino silicone oil, stir at 1200 rpm for 15 min, then add 12 parts of polyether triamine, 36 parts of polyether diamine, 3 parts of diethyl methane diamine and 5 parts of polysulfide rubber, heat to 70° C., and stir uniformly for 30 min at the stirring speed of 400-500 rpm/min to obtain Component R;

The preparation method of the surface-pretreated nano silica comprises: adding silica with a particle diameter of 50 nm to toluene, dispersing the mixture uniformly, then adding the coupling agent KH-550 slowly (the mass of the KH550 is 4% of silica particles), heating and refluxing for 2h, filtering, rinsing and drying to obtain surface-pretreated nano silica;

(3) Weigh Component A and Component R at the reactive functionality ratio of 1:1.02 (Component A to Component R), mix Component A and Component R with a supergravity reactor, heat to 62° C., adjust the pressure to 36 MPa, keep the flow rate of 0.183 L/min, and spray onto the surface of the substrate to obtain the elastomer material.

Embodiment 2

This embodiment refers to the elastomer material and its preparation method of Embodiment 1, except that the —NCO content of Component A—isocyanate prepolymer is 22%;

The preparation method of Component A comprises: mixing 30 g of polyether triol and 100 g of polyether diol uniformly, heating to 100-120° C. for dehydration for 2-3 h, then cooling to 70° C., adding 0.8 g of methyl isocyanate, 110 g of p-phenylene diisocyanate, and 30 g of triphenylmethane isocyanate, reacting for 2-3 h under heat insulation conditions, and defoaming and cooling to obtain Component A with a —NCO content of 22±1%.

Embodiment 3

This embodiment refers to the elastomer material and its preparation method of Embodiment 1, except that the —NCO content of Component A—isocyanate prepolymer is 30%;

The preparation method of Component A comprises: mixing 30 g of polyether triol and 100 g of polyether diol uniformly, heating to 100-120° C. for dehydration for 2-3 h, then cooling to 70° C., adding 1.5 g of methyl isocyanate, 220 g of p-phenylene diisocyanate, and 55 g of triphenylmethane isocyanate, reacting for 2-3 h under heat insulation conditions, and defoaming and cooling to obtain Component A with a —NCO content of 30±1%.

Embodiment 4

This embodiment refers to the elastomer material and its preparation method of Embodiment 1, except that Component A comprises isocyanate prepolymer obtained through reaction of polyether polyol with p-phenylene diisocyanate, and the isocyanate prepolymer has a —NCO content of 25%;

The preparation method of Component A comprises:

Mixing 30 g of polyether triol and 100 g of polyether diol uniformly, heating to 100-120° C. for dehydration for 2-3 h, then cooling to 70° C., adding 150 g of p-phenylene diisocyanate, reacting for 2-3 h under heat insulation conditions, and defoaming and cooling to obtain Component A with a —NCO content of 25±1%.

Embodiment 5

This embodiment refers to the elastomer material and its preparation method of Embodiment 1, except that Component A comprises isocyanate prepolymer obtained through reaction of polyether polyol with methyl isocyanate, p-phenylene diisocyanate and triphenylmethane isocyanate, and the isocyanate prepolymer has a —NCO content of 25%;

The preparation method of Component A comprises:

Mixing 30 g of polyether triol and 100 g of polyether diol uniformly, heating to 100-120° C. for dehydration for 2-3 h, then cooling to 70° C., adding 1 g of methyl isocyanate, 100 g of p-phenylene diisocyanate, and 125 g of triphenylmethane isocyanate, reacting for 2-3 h under heat insulation conditions, and defoaming and cooling to obtain Component A with a —NCO content of 25±1%.

Embodiment 6

This embodiment refers to the elastomer material and its preparation method of Embodiment 1, except that Component A comprises isocyanate prepolymer obtained through reaction of polyether polyol with methyl isocyanate, p-phenylene diisocyanate and triphenylmethane isocyanate, and the isocyanate prepolymer has a —NCO content of 25%;

The preparation method of Component A comprises:

Mixing 120 g of polyether diol uniformly, heating to 100-120° C. for dehydration for 2-3 h, then cooling to 70° C., adding 1 g of methyl isocyanate, 100 g of p-phenylene diisocyanate, and 125 g of triphenylmethane isocyanate, reacting for 2-3 h under heat insulation conditions, and defoaming and cooling to obtain Component A with a —NCO content of 25±1%.

Embodiment 7

This embodiment refers to the elastomer material and its preparation method of Embodiment 1, except that Component R comprises the following components in parts by weight: 24 parts of polyether triamine, 24 parts of polyether diamine, 3 parts of diethyl methane diamine, 5 parts of polysulfide rubber, 5 parts of surface-pretreated nano silica and 5 parts of amino silicone oil.

Embodiment 8

This embodiment refers to the elastomer material and its preparation method of Embodiment 1, except that Component R comprises the following components in parts by weight: 48 parts of polyether diamine, 3 parts of diethyl methane diamine, 5 parts of polysulfide rubber, 5 parts of surface-pretreated nano silica and 5 parts of amino silicone oil.

Embodiment 9

This embodiment refers to the elastomer material and its preparation method of Embodiment 1, except that Component R comprises the following components in parts by weight: 10 parts of polyether triamine, 35 parts of polyether diamine, 1 part of diethyl methane diamine, 1 part of polysulfide rubber, 2 parts of surface-pretreated nano silica and 3 parts of amino silicone oil.

Embodiment 10

This embodiment refers to the elastomer material and its preparation method of Embodiment 1, except that Component R comprises the following components in parts by weight: 15 parts of polyether triamine, 45 parts of polyether diamine, 6 parts of diethyl methane diamine, 10 parts of polysulfide rubber, 8 parts of surface-pretreated nano silica and 8 parts of amino silicone oil.

Embodiment 11

This embodiment refers to the elastomer material and its preparation method of Embodiment 1, except that diisocyanate in Component A is 4,4'-diphenylmethane diisocyanate.

Embodiment 12

This embodiment refers to the elastomer material and its preparation method of Embodiment 1, except that diisocyanate in Component A is toluene diisocyanate.

COMPARATIVE EXAMPLE 1

The comparative example refers to the preparation method of Embodiment 1, except that the —NCO content of Component A—isocyanate prepolymer is 18%;

The preparation method of Component A comprises: mixing 30 g of polyether triol and 100 g of polyether diol uniformly, heating to 100-120° C. for dehydration for 2-3 h, then cooling to 70° C., adding 0.6 g of methyl isocyanate, 83 g of p-phenylene diisocyanate, and 22 g of triphenylmethane isocyanate, reacting for 2-3 h under heat insulation conditions, and defoaming and cooling to obtain Component A with a —NCO content of 18±1%.

COMPARATIVE EXAMPLE 2

The comparative example refers to the preparation method of Embodiment 1, except that Component R comprises the following components in parts by weight: 12 parts of polyether triamine, 36 parts of polyether diamine, 10 parts of diethyl methane diamine, 5 parts of surface-pretreated nano silica and 5 parts of amino silicone oil.

COMPARATIVE EXAMPLE 3

The comparative example refers to the preparation method of Embodiment 1, except that Component R is not added with surface-pretreated nano silica.

COMPARATIVE EXAMPLE 4

The comparative example refers to the preparation method of Embodiment 1, except that Component R is not added with amino silicone oil.

EXPERIMENTAL EXAMPLE 1

In order to compare and explain the properties of the elastomer materials obtained in the embodiments and comparative examples of the invention, the following property tests were conducted for elastomer materials obtained in the embodiments and comparative examples, and the test results are shown in Table 1.

TABLE 1

Property test results of different elastomer materials

| Test method | Elongation (%) ASTM D412 | TABER wear (mg/1000 times/1000 g) ASTM D4060 | Water vapor transmission rate (g/m$^2$h) ASTM E96 |
|---|---|---|---|
| Embodiment 1 | 234 | 13 | 0.18 |
| Embodiment 2 | 231 | 16 | 0.22 |
| Embodiment 3 | 223 | 14 | 0.18 |
| Embodiment 4 | 225 | 18 | 0.20 |
| Embodiment 5 | 226 | 18 | 0.19 |
| Embodiment 6 | 224 | 20 | 0.23 |
| Embodiment 7 | 225 | 21 | 0.21 |
| Embodiment 8 | 220 | 18 | 0.22 |
| Embodiment 9 | 226 | 21 | 0.24 |
| Embodiment 10 | 229 | 17 | 0.22 |
| Embodiment 11 | 230 | 16 | 0.21 |
| Embodiment 12 | 229 | 20 | 0.23 |
| Comparative example 1 | 208 | 23 | 0.24 |
| Comparative example 2 | 203 | 21 | 0.34 |
| Comparative example 3 | 224 | 38 | 0.25 |
| Comparative example 4 | 210 | 34 | 0.39 |

As can be seen from the above table, the invention adjusts the —NCO content of isocyanate prepolymer to increase the hard segment content, thus reducing the soft segment content, and increasing the content of urea bonds in the elastomer and the rigid chain segments. Meanwhile, the polyether amine and polysulfide rubber blended in Component R ensure the elasticity of the polymer while improving the mechanical properties. Nano silica and amino silicone oil are added to the components to improve the grafting degree of silica in the elastomer material, thus improving the wear resistance of the material, structural compactness, water resistance and elongation rate.

Finally, it should be noted that the above embodiments are intended to illustrate the technical solutions of the invention and not to limit them; although the invention has been described in detail with reference to the said embodiments, those skilled in the art should understand that the technical solutions described in the said embodiments may be modified, or some or all of the technical features thereof may be equivalently substituted; however, such modifications or substitutions will not essentially make the corresponding technical solutions depart from the scope of technical solutions of the embodiments of the invention.

The invention claimed is:

1. An amino silicone oil-modified elastomer material, comprising a first component and a second component; the first component comprises an isocyanate prepolymer obtained through a reaction of a polyol and an isocyanate, and the isocyanate prepolymer has a —NCO content of 22-30%; the second component comprises: 45-60 parts by weight of a polyether amine, 1-6 parts by weight of a liquid amine chain extender, 1-10 parts by weight of a polysulfide rubber, 2-8 parts by weight of a nano silica, and 3-8 parts by weight of an amino silicone oil.

2. The amino silicone oil-modified elastomer material according to claim 1, wherein a mass ratio of the nano silica to the amino silicone oil is 1: (0.8-1.2).

3. The amino silicone oil-modified elastomer material according to claim 1, wherein the nano silica is a surface-pretreated nano silica;
the surface-pretreated nano silica is obtained by grafting a coupling agent on a surface of the nano silica; and
the coupling agent is a silane coupling agent.

4. The amino silicone oil-modified elastomer material according to claim 1, wherein the nano silica has a particle diameter of 50-80 nm.

5. The amino silicone oil-modified elastomer material according to claim 1, wherein a functionality ratio of the first component to the second component is 1: (1-1.05).

6. The amino silicone oil-modified elastomer material according to claim 1, wherein the isocyanate comprises a diisocyanate and a triisocyanate;
the isocyanate further comprises a monoisocyanate;
the diisocyanate comprises one of p-phenylene diisocyanate, 4,4'-diphenylmethane diisocyanate, and toluene diisocyanate.

7. The amino silicone oil-modified elastomer material according to claim 1, wherein the polyol comprises a glycol and a triol;
the polyether amine comprises one or more of a polyether triamine and a polyether diamine.

8. A preparation method of the amino silicone oil-modified elastomer material according to claim 1, comprising the following steps:
heating the polyol and dehydrating the polyol to obtain a dehydrated polyol, reacting the dehydrated polyol with the isocyanate at 50-90° C. for 2-3 h to obtain the isocyanate prepolymer, and defoaming the isocyanate prepolymer to obtain the first component;
mixing the nano silica and the amino silicone oil uniformly to obtain a first mixture, adding the polyether amine, the liquid amine chain extender and the polysulfide rubber to the first mixture to obtain a second mixture, mixing the second mixture and heating the second mixture to 50-90° C., and stirring the second mixture for 20-50 min to obtain the second component.

9. The preparation method of the amino silicone oil-modified elastomer material according to claim 8, wherein the nano silica and the amino silicone oil are mixed and stirred uniformly at a rotational speed of 1000-1500 rpm and a stirring time of 10-20 min.

10. The preparation method of the amino silicone oil-modified elastomer material according to claim 8, wherein at a temperature of 55-70° C. and a pressure of 30-40 MPa, the first component and the second component are mixed with a supergravity mixing method and sprayed to obtain the amino silicone oil-modified elastomer material.

11. The preparation method of the amino silicone oil-modified elastomer material according to claim 8, wherein a mass ratio of the nano silica to the amino silicone oil is 1: (0.8-1.2).

12. The preparation method of the amino silicone oil-modified elastomer material according to claim 8, wherein the nano silica is a surface-pretreated nano silica;
the surface-pretreated nano silica is obtained by grafting a coupling agent on a surface of the nano silica; and
the coupling agent is a silane coupling agent.

13. The preparation method of the amino silicone oil-modified elastomer material according to claim 8, wherein the nano silica has a particle diameter of 50-80 nm.

14. The preparation method of the amino silicone oil-modified elastomer material according to claim 8, wherein a functionality ratio of the first component to the second component is 1: (1-1.05).

15. The preparation method of the amino silicone oil-modified elastomer material according to claim 8, wherein the isocyanate comprises a diisocyanate and a triisocyanate;
the isocyanate further comprises a monoisocyanate;
the diisocyanate comprises one of p-phenylene diisocyanate, 4,4'-diphenylmethane diisocyanate, and toluene diisocyanate.

16. The preparation method of the amino silicone oil-modified elastomer material according to claim 8, wherein the polyol comprises a glycol and a triol;
the polyether amine comprises one or more of a polyether triamine and a polyether diamine.

* * * * *